United States Patent [19]

Seymour

[11] Patent Number: 5,469,957
[45] Date of Patent: Nov. 28, 1995

[54] BUCKET CONVEYOR CHAIN

[76] Inventor: Timothy H. Seymour, 9544 Moran St., Biloxi, Miss. 39532

[21] Appl. No.: 316,934

[22] Filed: Oct. 3, 1994

[51] Int. Cl.$^6$ ................................................ B65G 17/36
[52] U.S. Cl. ........................................ 198/711; 198/844.2
[58] Field of Search .................................. 198/701, 710, 198/711, 712, 713, 844.2

[56] References Cited

U.S. PATENT DOCUMENTS

| 4,552,220 | 11/1985 | Jones | 198/712 X |
| 5,236,079 | 8/1993 | Herold | 198/844.2 |

FOREIGN PATENT DOCUMENTS

| 0051692 | 5/1982 | European Pat. Off. | 198/711 |
| 2600494 | 7/1977 | Germany | 198/712 |
| 0105808 | 5/1987 | Japan | 198/711 |
| 1562244 | 5/1990 | U.S.S.R. | 198/844.2 |
| 1668225 | 8/1991 | U.S.S.R. | 198/844.2 |

*Primary Examiner*—James R. Bidwell

[57] ABSTRACT

An improved bucket conveyor chain that uses a series of metal plate type links 3 connected together at adjacent ends by a pair of bars 5. The bars 5 also hold adjacent plates up off the wheel's 1 driving surface, they also provide a surface for attaching buckets 17 and guide bars 19.

7 Claims, 2 Drawing Sheets

BUCKET CONVEYOR CHAIN

BACKGROUND—FIELD OF INVENTION

This invention relates to a bucket conveyor comprised of an endless band or strand type chain.

BACKGROUND—DESCRIPTION OF PRIOR ART

Past bucket conveyor chains can be grouped into two general groups, i.e., those in which the buckets are connected to rigid links that are hinged together to form an endless chain and those in which the buckets are connected to bands of rubber, leather, wire rope, or metal which are joined at the ends to form an endless belt. My present invention relates to improving the structure of bucket conveyor chains comprised of endless metal belts, including structure for guiding the belt laterally as it goes about its support wheels, attaching buckets, preventing damage, easy maintenance, etc.

Past conveyor chains which are related to my present invention teach how to make an elastomer belt with internal wire or cable reinforcement, how to splice together the ends of belts made of rubber, leather, canvas or other similar materials, and how to attach buckets to the flat sides of these type of belts. Those relating to metal bands are very in general and deal primarily with welding or brazing the ends of a strip of metal together to form an endless metal band, etc. My present invention differs from these by teaching the specifics of how to manufacture a bucket conveyor chain comprised of a plurality of metal plates.

OBJECTS AND ADVANTAGES

Accordingly I claim the following as my objects and advantages of the invention:

To introduce a much improved bucket conveyor chain comprised of a series of metal plates.

To introduce an easy to repair metal plate chain.

To introduce a bar for holding the chain's link plates up off of the supporting wheels to prevent damage.

To introduce a protective cover to protect the chain's link plates from damage.

To introduce a guide to track the chain as it travels around the wheels.

To introduce a plurality of laterally spaced link plates to protect the chain from separating and pulling apart should a link plate break.

To introduce a way to mount buckets to the metal links.

To introduce a useful conveyor and chain arrangement.

DRAWING FIGURES

FIG. 3 is similar to FIG. 2 with the exception that the wheel is not shown and the chain has been straightened out and drawn larger for clarity.

Figure 1:
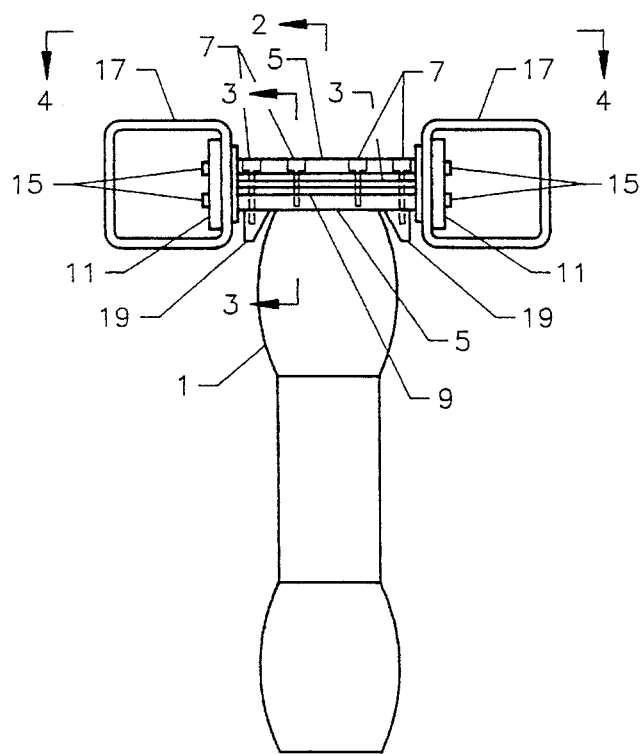
FIG. 1 shows a cross sectional view through the bucket conveyor chain and its supporting wheel.
Figure 4:
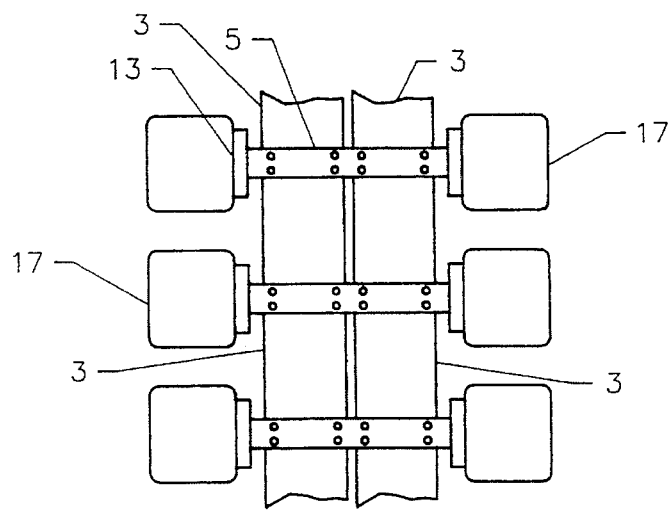

FIG. 4 shows a view along lines 4—4 of FIG. 1. It shows the lateral location of a plural series of link plates. The protective covers are not shown for clarity of the position of the link plates 3.

Figure 5:
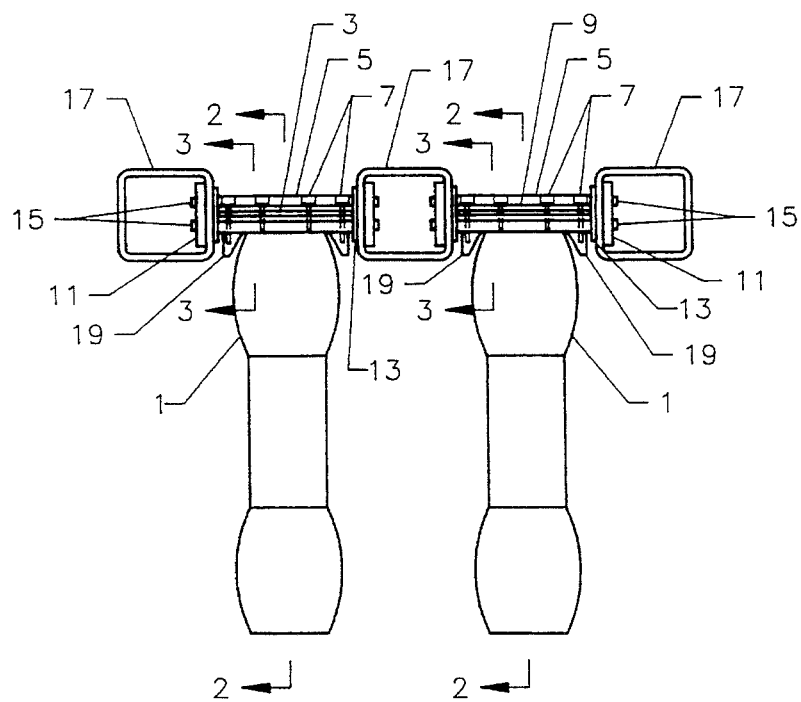

FIG. 5 is a cross sectional view similar to FIG. 1 through the bucket conveyor chain and its supporting wheel to show the use of multiple strands.

Figure 6:
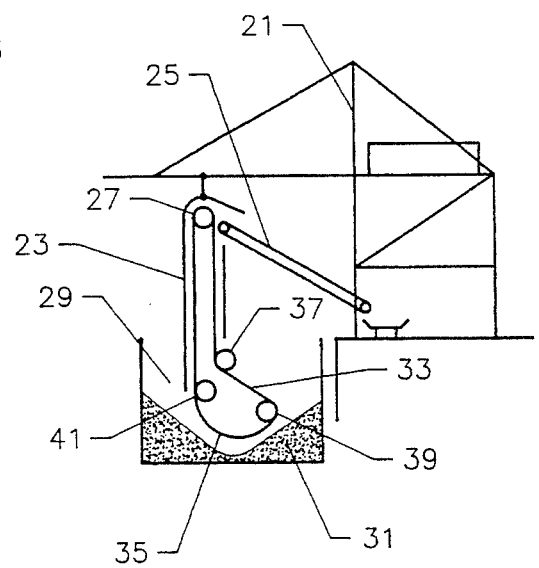

FIG. 6 is a schematic view of a useful conveyor arrangement that is much improved when combined with the chain disclosed in this invention.

DRAWING REFERENCE NUMERALS 1 wheel
3 link plate
5 bar
7 bar screws
9 protective covering
11 internal bucket plate
13 external bucket plate
15 bucket screws
17 bucket
19 guide
21 support structure
23 bucket conveyor frame
25 discharge conveyor
27 upper wheel
29 vessel's hold
31 cargo
33 bucket conveyor chain
35 primary loop of bucket conveyor—used for reclaiming
37 exit wheel
39 guide wheel
41 gather wheel

DESCRIPTION OF THE INVENTION

Figure 3:
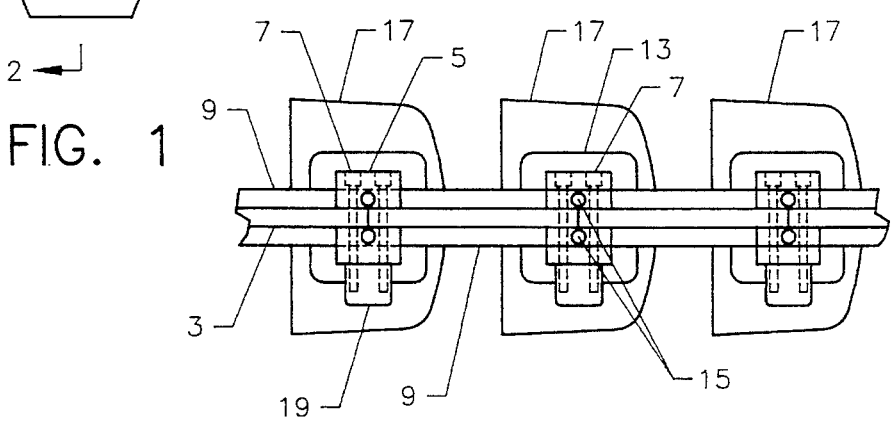
FIG. 3 shows a cross sectional view along lines 3—3 of FIG. 1.

Referring to FIGS. 1 and 3, the chain is comprised of a series of link plates 3. The ends of adjoining link plates 3 are butted together and held in position by a pair of bars 5 which are clamped together over and under the ends of adjoining link plates 3. The clamping force is provided by bar screws 7 which mount in holes match drilled in the ends of link plates 3 and bars 5. These screws are also countersunk in bars 5 to prevent damaging the wheels 1.

Referring to FIG. 1, buckets are attached to the ends of bars 5 by bucket screws 15 which protrude through holes drilled in internal bucket plate 11, bucket 17, and external bucket plate 13. Internal bucket plate 11 and external bucket plate 13 are used to distribute the compressive stresses created by the clamping force of the bucket screws 15 upon the shell of bucket 17. The sides of the bucket 17 and/or the external bucket plate 13 can be used to guide the chain together with or without the use of additional guides. The external 13 and internal 11 bucket plates can be used to mount other accessories. The above described construction i.e., small pieces held together with screws, makes assembly and disassembly very easy.

Referring to FIGS. 1 and 3, protective coverings 9 made of a flexible material such as rubber are attached to the exposed surfaces (tops, bottoms, and edges) of link plates 3 in the areas where link plates are not in contact with bars 5. Referring to FIG. 4, a plural series of link plates 3 can be used instead of a single series of plate 3. In other words, more than one link plate can be mounted side by side. This arrangement would prevent the chain from breaking apart if one of the adjacent lateral link plates 3 was to break in half.

Referring to FIGS. 1 and 3, a pair of guides 19 are mounted laterally opposite each other along the bar 5. Bar screws 7 are used to mount guide 19 to bar 5. Guides 19 are positioned adjacent to the sides of wheel 1 in order to prevent the chain from coming off of the wheel. Wheel 1 supports and guides the chain as it circulates about and conveys material.

Referring to FIG. 4, the ends of bars 5 extend out past the edges of link plates 3 to provide a standoff for mounting buckets 17 or external bucket plates 13. This prevents the buckets 17 or external bucket plates 13 from contacting the edges of link plates 3.

FIG. 6 shows a conveyor arrangement that is very much improved when combined with the above described new chain. This is because the new chain allows for this conveyor to be made simpler, lighter, faster, and more durable than methods of the past. These advantages are especially needed when this type of conveyor is used for a continuous ship unloader. The conveyor comprises a support structure 21 which supports a bucket conveyor frame 23. The bucket conveyor frame 23 is lowered into a vessel's hold 29 where it reclaims, elevates, and transfers the cargo 31 to a discharge conveyor 25 which removes the cargo 31 from the unloader for storage, etc. The bucket conveyor frame 23 is comprised of a plurality of wheels which guide the bucket conveyor chain 33 as follows: the exit wheel 37 directs the bucket conveyor chain 33 outward to bucket guide wheel 39. Bucket guide wheel 39 directs the chain downward into a primary loop 35 which is used to fill the buckets 17 by dragging them through the cargo 31. After traveling through this loop 35 the bucket conveyor chain 33 is gathered by gather wheel 41 and directed to an upper wheel 27. The cargo is then discharged onto the discharge conveyor 25. The upper wheel 27 directs the chain 33 downward to the exit wheel 37 completing one complete circuit.

OPERATION OF THE INVENTION

Figure 2:
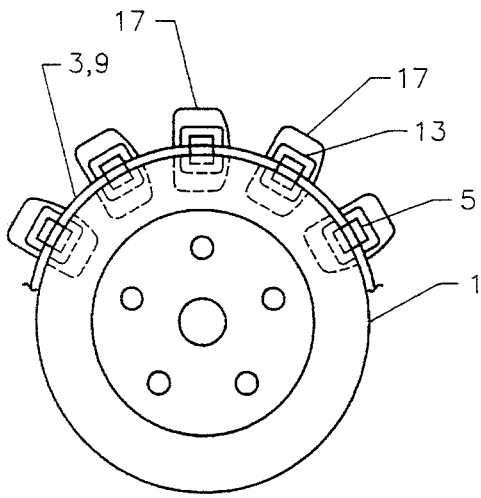
FIG. 2 is a schematical cross sectional view along the lines 2—2 of FIG. 1.

Referring to FIG. 1., wheel 1 is turned by a suitable power source. Friction between the wheel and bar 5 provides a tractive force to propel the chain. As the chain circulates around the wheel 1, the link plates 3 bend allowing the chain to go around the wheel 1. Referring to FIGS. 1 and 2, the bars 5 must be thick enough and closely spaced to prevent the link plates 3 from contacting the wheels 1. This prevents damage to plates 3 should foreign matter such as rocks get between the wheel 1 and the link plates 3. The guides 19 contact the sides of said wheel thus providing lateral guidance of the chain so that it doesn't come off the wheel 1. In some cases the guides 19 can be omitted and the side of the bucket 17 and/or the external bucket plate 13 can be used to laterally guide the chain. The material to be conveyed by the buckets is scooped up by or fed into the buckets 17 as required.

Referring to FIG. 5, in order to increase capacity more than one strand of the above described chain can be used together to mount several rows of buckets together. In this arrangement a plurality of laterally spaced wheels 1 can be used to support the chain.

As shown in FIG. 6, the support structure 21 holds the bucket conveyor frame 23 adjacent to the cargo 31 in a vessel's hold 29. The support structure 21 can be mobile or fixed. The bucket conveyor chain 33 is supported and circulated by the wheels 27, 37, 39, 41 as shown in FIG. 6. The wheels can be powered or idlers as required. More wheels can be used if necessary to assist discharging,
controlling chain dynamics, etc. The buckets 17 of the bucket conveyor chain 33 drag through and scoop up the cargo 31 as they traverse the loop 35. The bucket conveyor chain 33 then elevates the cargo up and over wheel 27 where a combination of gravity and centrifugal force are used to dump the cargo out of the buckets 17 onto the discharge conveyor 25 where it is removed from the unloader.

Accordingly the reader is requested to determine the scope of the invention by the appended claims and their legal equivalents, and not by the examples which have been given. For example: buckets can be attached anywhere to the new chain, a protective coating can be provided to cover the exposed area of bars 5, the sides of buckets could be guided by a structure other than the wheels, etc.

I claim:

1. An improved conveyor chain comprising an endless band mounted upon a plurality of wheels, said improvement comprising:

a series of metal plates, the ends of said plates adjoining one another to form said endless band, said plates having one or more holes at each end, a series of paired bars, said paired bars having matching holes, wherein the ends of adjoining said plates are interposed between said pair of bars, a fastener, said fastener passing through said matching holes in said pair of bars and the holes in the ends of said plates providing a means for connecting the adjoining ends of said plates together to form said endless band, wherein said paired bars are positioned so that one of said paired bars is interposed between said endless band and the outer periphery of said wheels, wherein adjacent bars of said series of paired bars are spaced in close proximity of one another thereby preventing the said series of metal plates from contacting the outer periphery of said wheels.

2. The apparatus of claim 1, further comprising, an appendage, providing a means for attaching said appendage to said paired bars, said appendage extending outward from the said paired bars and the flat surface of said plates, wherein, said appendages have a smooth side for contacting the sides of said wheels preventing the said endless band from coming off of said wheels.

3. The apparatus of claim 1, further comprising, a plurality of protective covers, providing a means for attaching said covers to the exposed surfaces of said plates, said covers further preventing the said plates from contacting the outer periphery of said wheels and from other physical damage.

4. An improved conveyor chain comprising an endless band mounted upon a plurality of wheels, said improvement comprising:

a series of metal plates, the ends of said plates adjoining one another to form a single endless band, a plurality of said single endless bands being located side by side with one another, said plates having one or more holes at each end, a series of paired bars, said paired bars having matching holes, wherein said series of paired bars span across the width of the plurality of said single endless bands, wherein the ends of adjoining said plates are interposed between said pair of bars, a plurality of fasteners, said fasteners passing through said matching holes in said pair of bars and the said holes in the ends of said plates providing a means for connecting the adjoining ends of said plates and the said plurality of single endless bands together to form said endless band.

5. The apparatus of claim 4, further comprising, an appendage, providing a means for attaching said appendage to the said paired bars, said appendage extending outward from the said paired bars and the flat surface of said plates, wherein, said appendages have a smooth side for contacting the sides of said wheels preventing the said endless band from coming off of said wheels.

6. The apparatus of claim 4, further comprising, a plurality of protective covers, providing a means for attaching said covers to the exposed surfaces of said plates, said covers further preventing the said plates from contacting the outer periphery of said wheels and from other physical damage.

7. An improved conveyor comprising:

a support structure, a frame, an endless bucket chain, a discharge conveyor, a plurality of wheels mounted to said frame, wherein said plurality of wheels supports and circulates said endless bucket chain about said plurality of wheels, means connected to said frame near the lower end of said frame for deflecting said bucket chain outward and down to form a loop, wherein said support structure supports said frame and said discharge conveyor, said discharge conveyor is connected to said frame, and wherein said bucket chain contacts the material to be reclaimed while traversing said loop, the improvement comprising, a series of metal plates, the ends of said plates adjoining one another to form a single endless band, a plurality of said single endless bands being located side by side with one another, said plates having one or more holes at each end, a series of paired bars, said paired bars having matching holes, wherein said series of paired bars span across the width of the plurality of said single endless bands, wherein the ends of adjoining said plates are interposed between said pair of bars, a plurality of fasteners, said fasteners passing through said matching holes in said pair of bars and the said holes in the ends of said plates providing a means for connecting the adjoining ends of said plates and the said plurality of single endless bands together to form said endless band.

* * * * *